(12) United States Patent
Cory

(10) Patent No.: US 10,855,142 B2
(45) Date of Patent: Dec. 1, 2020

(54) POWER SYSTEM FOR WELL SERVICE PUMPS

(71) Applicant: Supreme Electrical Services, Inc., Houston, TX (US)

(72) Inventor: Glass Cory, Houston, TX (US)

(73) Assignee: Supreme Electrical Services, Inc., Houston, TX (US)

( * ) Notice: Subject to any disclaimer, the term of this patent is extended or adjusted under 35 U.S.C. 154(b) by 778 days.

(21) Appl. No.: 15/490,393

(22) Filed: Apr. 18, 2017

(65) Prior Publication Data

US 2017/0302135 A1 Oct. 19, 2017

Related U.S. Application Data

(60) Provisional application No. 62/324,411, filed on Apr. 19, 2016.

(51) Int. Cl.
*H02K 7/18* (2006.01)
*E21B 41/00* (2006.01)
*E21B 43/26* (2006.01)
*E21B 43/267* (2006.01)
*F04B 17/03* (2006.01)
*F04B 47/02* (2006.01)
*H02P 27/06* (2006.01)

(52) U.S. Cl.
CPC ....... *H02K 7/1823* (2013.01); *E21B 41/0085* (2013.01); *E21B 43/26* (2013.01); *E21B 43/267* (2013.01); *F04B 17/03* (2013.01); *F04B 47/02* (2013.01); *H02P 27/06* (2013.01)

(58) Field of Classification Search
CPC ...... B60W 10/08; B60W 20/50; B60W 10/06; Y02T 10/7077; B60K 6/445
See application file for complete search history.

(56) References Cited

U.S. PATENT DOCUMENTS

| 2015/0211512 A1* | 7/2015 | Wiegman | F04B 23/06 417/2 |
|---|---|---|---|
| 2019/0162061 A1* | 5/2019 | Stephenson | H01M 8/24 |
| 2019/0377021 A1* | 12/2019 | Bhalwankar | G01R 31/52 |

* cited by examiner

*Primary Examiner* — Zoheb S Imtiaz
(74) *Attorney, Agent, or Firm* — Leela Madan

(57) ABSTRACT

A power system for use in hydraulic fracturing or fracking of wells is disclosed. The power system is generally self-contained on a transportable system, such as a trailer. The weight and configuration of the trailer must be sized to be hauled legally on United States roadways. The system components include a turbine generator, rectifier, inverter units and AC motors.

18 Claims, 1 Drawing Sheet

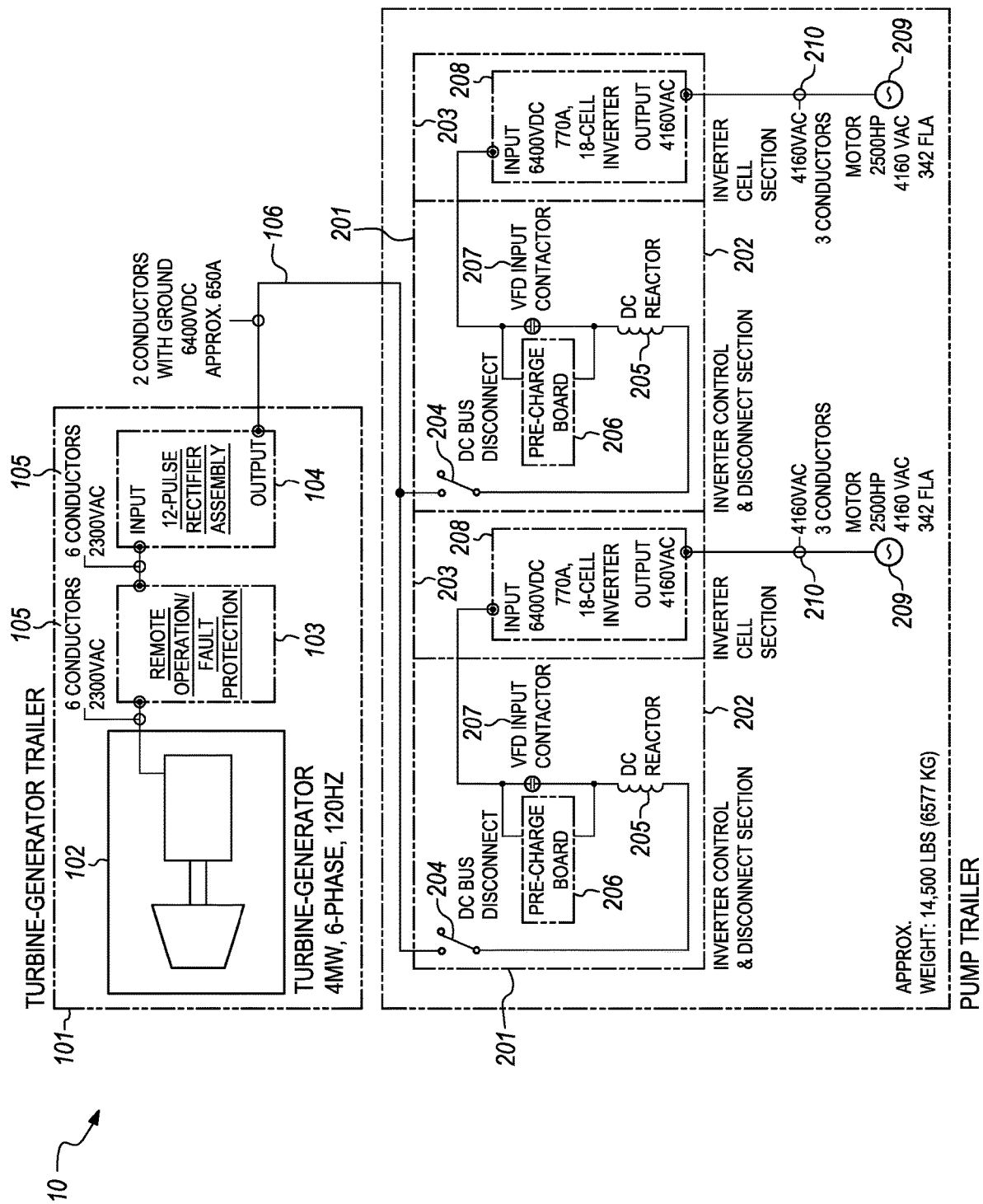

POWER SYSTEM FOR WELL SERVICE PUMPS

CROSS REFERENCE TO RELATED APPLICATION

This application claims benefit under 35 U.S.C. § 119(e) to U.S. Provisional Application No. 62/324,411, filed Apr. 19, 2016, which is incorporated by reference herein in its entirety.

BACKGROUND OF THE INVENTION

Field of the Invention

The present invention relates generally to self-contained trailers useful in hydraulic fracturing, and more specifically to a portable turbine power plant operable to generate AC electric power.

Background Information

Hydraulic fracturing is the fracturing of rock by a pressurized liquid. Some hydraulic fractures form naturally, certain veins or dikes are examples. Induced hydraulic fracturing or hydrofracturing is a technique in which typically water is mixed with sand and chemicals, and the mixture is injected at high pressure into a wellbore to create fractures, which form conduits along which fluids such as gas, petroleum, and groundwater may migrate to the well. The technique is very common in wells for shale gas, tight gas, tight oil, and coal seam gas.

A hydraulic fracture is formed by pumping the fracturing fluid into the wellbore at a rate sufficient to increase pressure downhole to exceed that of the fracture gradient (pressure gradient) of the rock. The fracture gradient is defined as the pressure increase per unit of the depth due to its density and it is usually measured in pounds per square inch per foot or bars per meter. The rock cracks and the fracture fluid continue further into the rock, extending the crack still further, and so on. Operators typically try to maintain "fracture width", or slow its decline, following treatment by introducing into the injected fluid a proppant—a material such as grains of sand, ceramic, or other particulates that prevent the fractures from closing when the injection is stopped and the pressure of the fluid is reduced. Consideration of proppant strengths and prevention of proppant failure becomes more important at greater depths where pressure and stresses on fractures are higher. The propped fracture is permeable enough to allow the flow of formation fluids to the well. Formation fluids include gas, oil, salt water, fresh water and fluids introduced to the formation during completion of the well during fracturing.

Fracturing is typically performed by large diesel-powered pumps. Such pumps are able to pump fracturing fluid into a wellbore at a high enough pressure to crack the formation, but they also have drawbacks. Driving such pumps may rely on methods for supplying electrical power, including integrated power networks to facilitate power distribution to operate motors driving the pumps. Presently, such power generation requires large trailers for housing such systems at production fields. What is needed is an electric power generating system that does not create a large footprint.

SUMMARY OF THE INVENTION

The present invention relates to a portable power generation system for use in a fracturing plant. Equipment is mounted on a trailer and is delivered to a well site with a tractor. Pumps are driven by motors powered by a turbine mounted on the trailer, where motors are controlled by associated electronics.

In one embodiment, a portable power generation system is disclosed including a turbine generator, mounted on a first trailer, operable to generate AC electrical power electrically coupled to a remote fault protector by at least six (6) first high voltage AC (HVAC) conductors, where the remote fault protector is electrically coupled by at least six (6) second HVAC conductors to a rectifier assembly operable to generate DC electrical power; at least one inverter unit, mounted on a second trailer, electrically coupled to the rectifier assembly by at least two (2) first high voltage DC (HVDC) conductors, where the at least one inverter unit comprises an inverter control and disconnect section and an inverter cell section, where the inverter unit is operable to generate AC electrical power; and at least one electrical motor, mounted on the second trailer, electrically connected to the at least one inverter unit by at least two (2) third HVAC conductors, where the motor drives one or more well service pumps.

In one aspect, the rectifier assembly is a 12-pulse rectifier assembly.

In another aspect, the inverter control and disconnect section comprises a DC bus single pole/single throw (SPST) disconnect, a DC reactor, and a VFD input contactor, where the VFD input contactor is electrically coupled to a precharge board, and where the inverter control and disconnect section are electrically coupled to the inverter cell section.

In one aspect, the second trailer comprises two (2) inverter units and two (2) electric motors.

In another aspect, the turbine is a gas or diesel turbine. In a related aspect, the turbine is a 4 MW, 6-phase, 120 Hz turbine.

In one aspect, the first and second HVAC conductors are 2300V AC conductors. In another aspect, the first HVDC conductors are 6400 V DC conductors.

In one aspect, the inverter cell section comprises a 770 A, 18-cell inverter, having a 6400V DC input and a 4160V AC output. In another aspect, the third HVAC conductors are 4160V AC conductors. In a related aspect, the at least one electric motor is a 2500 HP, 4160V AC motor.

In one embodiment, a portable power generation system is disclosed including a 6-phase, 120 HZ turbine generator, mounted on a first trailer, operable to generate AC electrical power electrically coupled to a remote fault protector by at least six (6) first high voltage AC (HVAC), 2300 V AC conductors, where the remote fault protector is electrically coupled by at least six (6) second HVAC, 2300V AC conductors to a 12-pulse rectifier assembly operable to generate DC electrical power; two (2) inverter units, mounted on a second trailer, electrically coupled to the rectifier assembly by at least two (2) first high voltage DC (HVDC) conductors, where each the two (2) inverter units comprise an inverter control and disconnect section and an inverter cell section, where the each two (2) inverter units are operable to generate AC electrical power; and two (2) electrical motors, mounted on the second trailer, where each electric motor is electrically connected separately to one of the two (2) inverter units by a set of at least two (2) third HVAC conductors, where each motor drives one or more well service pumps.

In a related aspect, the service pump is a quintuplex plunger-style fluid pump. In a further related aspect, the service pump is a triplex plunger style fluid pump.

In another embodiment, a portable power generation system is disclosed including a turbine generator, mounted on a first trailer, operable to generate AC electrical power electrically coupled to a remote fault protector by at least six (6) first high voltage AC (HVAC) conductors, where the remote fault protector is electrically coupled by at least six (6) second HVAC conductors to a 12-pulse rectifier assembly operable to generate DC electrical power; two (2) inverter units, mounted on a second trailer, electrically coupled to the rectifier assembly by at least two (2) first high voltage DC (HVDC) conductors, where each inverter unit includes:

a) an inverter control and disconnect section containing a DC bus single pole/single throw (SPST) disconnect, a DC reactor, and a VFD input contactor, where the VFD input contactor is electrically coupled to a pre-charge board; and b) an inverter cell section electrically coupled to the inverter control and disconnect section, which inverter cell section contains a 770 A, 18-cell inverter, having a 6400V DC input and a 4160V AC output; and two (2) electrical motors, mounted on the second trailer, where each electric motor is electrically connected separately to one of the two (2) inverter units by a set of at least two (2) third HVAC conductors, where each motor drives one or more well service pumps.

BRIEF DESCRIPTION OF THE DRAWINGS

FIG. 1 is a schematic of the skid/trailer mounted variable frequency drive (VFD) single line.

DETAILED DESCRIPTION OF THE INVENTION

Before the present devices, methods, and methodologies are described, it is to be understood that this invention is not limited to particular devices, methods, and conditions described, as such devices, methods, and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "a pump" includes one or more pumps, and/or devices of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein can be used in the practice or testing of the invention, as it will be understood that modifications and variations are encompassed within the spirit and scope of the instant disclosure.

As used herein, "about," "approximately," "substantially" and "significantly" will be understood by a person of ordinary skill in the art and will vary in some extent depending on the context in which they are used. If there are uses of the term which are not clear to persons of ordinary skill in the art given the context in which it is used, "about" and "approximately" will mean plus or minus <10% of particular term and "substantially" and "significantly" will mean plus or minus >10% of the particular term.

As used herein, "footprint" means the on-site area required to accommodate a fracturing operation.

As used herein, "trailer unit" may be a trailer that is part of a tractor-trailer or a container which is mountable onto a trailer that is part of a tractor-trailer.

The technique of hydraulic fracturing is used to increase or restore the rate at which fluids, such as petroleum, water, or natural gas can be recovered from subterranean natural reservoirs. Reservoirs are typically porous sandstones, limestones or dolomite rocks, but also include "unconventional reservoirs" such as shale rock or coal beds. Hydraulic fracturing enables the production of natural gas and oil from rock formations deep below the earth's surface. At such depths, there may not be sufficient permeability or reservoir pressure to allow natural gas and oil to flow from the rock into the wellbore at economic rates. Thus, creating conductive fractures in the rock is pivotal to extract gas from shale reservoirs because of the extremely low natural permeability of shale. Fractures provide a conductive path connecting a larger volume of the reservoir to the well. So-called "super fracking", which creates cracks deeper in the rock formation to release more oil and gas, will increase efficiency of hydraulic fracturing.

High-pressure fracture fluid is injected into the wellbore, with the pressure above the fracture gradient of the rock. The two main purposes of fracturing fluid are to extend fractures and to carry proppant into the formation, the purpose of which is to stay there without damaging the formation or production of the well.

The blended fluids, under high pressure, and proppant are pumped into the well, fracturing the surrounding formation. The proppant material will keep an induced hydraulic fracture open, during or following a fracturing treatment. The proppant material holds the fractured formation open to enhance rate of gas or oil recovery. The fluid is normally water. A polymer or other additive may be added to the water to decrease friction loss as the water is pumped down a well. Water containing the polymer is usually called "slick water." Other polymers may be used during a treatment to form a more viscous fluid. Proppant is added to the fluid to prevent closure of fractures after pumping stops.

Fluids make tradeoffs in such material properties as viscosity, where more viscous fluids can carry more concentrated proppant; the energy or pressure demands to maintain a certain flux pump rate (flow velocity) that will conduct the proppant appropriately; pH, various rheological factors, among others. Types of proppant include silica sand, resin-coated sand, and man-made ceramics. These vary depending on the type of permeability or grain strength needed. The most commonly used proppant is silica sand, though proppants of uniform size and shape, such as a ceramic proppant, is believed to be more effective. Due to a higher porosity within the fracture, a greater amount of oil and natural gas is liberated.

The fracturing fluid varies in composition depending on the type of fracturing used, the conditions of the specific well being fractured, and the water characteristics. A typical fracture treatment uses between 3 and 12 additive chemicals. Although there may be unconventional fracturing fluids, the more typically used chemical additives can include one or more of the following:

Acids—hydrochloric acid (usually 28%-5%), or acetic acid is used in the pre-fracturing stage for cleaning the perforations and initiating fissure in the near-wellbore rock.

Sodium chloride (salt)—delays breakdown of the gel polymer chains.

Polyacrylamide and other friction reducers—minimizes the friction between fluid and pipe, thus allowing the pumps to pump at a higher rate without having greater pressure on the surface.

Ethylene glycol—prevents formation of scale deposits in the pipe.

Borate salts—used for maintaining fluid viscosity during the temperature increase.

Sodium and potassium carbonates—used for maintaining effectiveness of crosslinkers.

Glutaraldehyde—used as disinfectant of the water (bacteria elimination).

Guar gum and other water-soluble gelling agents—increases viscosity of the fracturing fluid to deliver more efficiently the proppant into the formation.

Citric acid—used for corrosion prevention.

Isopropanol—increases the viscosity of the fracture fluid.

Hydraulic-fracturing equipment used in oil and natural gas fields usually consists of a slurry blender, one or more high-pressure, high-volume fracturing pumps (typically powerful triplex or quintuplex pumps) and a monitoring unit. Associated equipment includes fracturing tanks, one or more units for storage and handling of proppant, high-pressure treating iron, a chemical additive unit (used to accurately monitor chemical addition), low-pressure flexible hoses, and many gauges and meters for flow rate, fluid density, and treating pressure.

The system as disclosed herein has the advantage of being able to use motors for driving pumps that still fit a standard trailer.

In embodiments, the components of the system as described, including the electric motors may be capable of operating during prolonged pumping operations, and at temperatures in the range of about 0° C. or lower to about 55° C. or greater. In addition, each electronic motor is coupled with a variable frequency drive(s) (VFD).

FIG. 1 shows a schematic for the VFD single line 10 as disclosed herein. As shown, the system 10 consists essentially of two (2) trailers 101/201, where the first trailer 101 contains a turbine generator 102, remote operation/fault detection device 103 and a pulse rectifier assembly 104 electrically connected by high voltage AC (HVAC) conductors 105 to convert AC power generated by the turbine generator 102 to DC power via the rectifier 104. Power from the trailer 101 is transferred to the second trailer 201 via High Voltage DC (HVDC) conductors 106 (with ground), which conductors 106 are electrically connected to two (2) inverter units 201, which inverter units 201 contain a inverter control and disconnect section 202 and an inverter cell section 203. The inverter control and disconnect section 202 contains a single pole/single throw (SPST) DC bus 204 in electrical communication with a DC reactor 205 and pre-charge board 206 and a VFD input contactor 207. The inverter control and disconnect section 202 is in electrical communication with the inverter cell section, which inverter cell section 203 contains a 770 A, 18-cell inverter 208, having an input of 6400V DC and an output of 4160V AC. Each inverter 208 is in electrical communication with an electric motor 209 via three (3) 4160V AC conductors 210, which motors 209 may then be electrically connected to one or more well service pumps (not shown).

Pump control and data monitoring equipment may be mounted on a control vehicle (not shown), and connected to the pumps, motors, and other equipment to provide information to an operator, and allow the operator to control different parameters of the fractioning operation.

Advantages of the present system include:

1) Power generation, associated electronics and motors are integrated with the trailer.

2) The trailer is self-contained and can function independently of other trailers or equipment at the site.

3) Physical footprint reduced relative to systems necessary to produce same HP.

In embodiments, the turbine is a 4 MW, 120 Hz, 6-phase generator. In one aspect, the inverters weigh about 14,500 lbs. The dimensions as envisage would allow the power system as disclosed to be easily transported by conventional tractor trailer systems. The ability to transfer the equipment of the present disclosure directly on a truck body or two (2) to a trailer increases efficiency and lowers cost. In addition, by eliminating or reducing the number of trailers that carry the equipment, the equipment may be delivered to sites having a restricted amount of space, and may be carried to and away from worksites with less damage to the surrounding environment.

In embodiments, the systems as disclosed may also be used for off-shore sites. The systems as disclosed are smaller and lighter than the equipment typically used on the deck of offshore vessels, thus removing some of the current ballast issues and allowing more equipment or raw materials to be transported by the offshore vessels.

While the technology has been shown or described in only some of its forms, it should be apparent to one of skill in the art that it is not so limited, but is susceptible to various changes without departing from the scope of the technology. Further, it is to be understood that the above disclosed embodiments are merely illustrative of the principles and applications of the present technology. Accordingly, numerous modifications may be made to the illustrative embodiments and other arrangements can be devised without departing for the spirit and scope of the present technology as defined by the appended claims.

All references recited are incorporated herein by reference in their entireties.

I claim herein:

1. A portable power generation system comprising: a turbine generator, mounted on a first trailer unit, operable to generate AC electrical power electrically coupled to a remote fault protector by at least 6 first high voltage AC conductors, wherein the remote fault protector is electrically coupled by at least 6 second high voltage AC conductors to a rectifier assembly operable to generate DC electrical power; at least one inverter unit, mounted on a second trailer unit, electrically coupled to said rectifier assembly by at least two first high voltage DC conductors, wherein said at least one inverter unit comprises an inverter control and disconnect section and an inverter cell section, wherein said inverter unit is operable to generate AC electrical power, and wherein the inverter control and disconnect section comprises a DC bus single pole/single throw disconnect, a DC reactor, and a variable frequency drive input contactor, wherein the variable frequency drive input contactor is electrically coupled to a pre-charge board, and wherein the inverter control and disconnect section are electrically coupled to the inverter cell section; and at least one electric motor, mounted on said second trailer unit, electrically connected to said at least one inverter unit by two or more third high voltage AC conductors, wherein said atleast one electric motor drives one or more well service pumps.

2. The system of claim 1, wherein the rectifier assembly is a 12-pulse rectifier assembly.

3. The system of claim 1, wherein the turbine is a gas or diesel turbine.

4. The system of claim 1, wherein the turbine is a 4 MW, 6-phase, 120 Hz turbine.

5. The system of claim 1, wherein the first and second high voltage AC conductors are 2300V AC conductors.

6. The system of claim 1, wherein the first high voltage DC conductors are 6400 V DC conductors.

7. The system of claim 1, wherein the inverter cell section comprises a 770 A, 18-cell inverter, having a 6400V DC input and a 4160V AC output.

8. The system of claim 1, wherein the third high voltage AC conductors are 4160V AC conductors.

9. The system of claim 1, wherein the at least one electric motor is a 2500 HP, 4160V AC motor.

10. The system of claim 1, wherein the first and second trailer units are each selected from the group consisting of a skid, a trailer and a container.

11. A portable power generation system comprising: a 6-phase, 120 HZ turbine generator, mounted on a first trailer unit, operable to generate AC electrical power electrically coupled to a remote fault protector by at least 6 first high voltage AC, 2300 VAC conductors, wherein the remote fault protector is electrically coupled by at least 6 second high voltage AC, 2300V AC conductors to a 12-pulse rectifier assembly operable to generate DC electrical power; two inverter units, mounted on a second trailer unit, electrically coupled to said rectifier assembly by at least two first high voltage DC conductors, wherein each of said two inverter units comprises an inverter control and disconnect section and an inverter cell section, wherein each of said two inverter units are operable to generate AC electrical power, and wherein the inverter control and disconnect section comprises a DC bus single pole/single throw disconnect, a DC reactor, and a variable frequency drive input contactor, wherein the variable frequency drive input contactor is electrically coupled to a pre-charge board, and wherein the inverter control and disconnect section are electrically coupled to the inverter cell section; and two electric motors, mounted on said second trailer unit, wherein each of said electric motor is electrically connected separately to one of said two inverter units by a set of two or more third high voltage AC conductors, wherein each of said electric motors drive one or more well service pumps.

12. The system of claim 11, wherein the turbine is a gas or diesel turbine.

13. The system of claim 11, wherein each inverter cell section comprises a 770 A, 18-cell inverter, having a 6400V DC input and a 4160V AC output.

14. The system of claim 11, wherein the third high voltage AC conductors are 4160V AC conductor.

15. The system of claim 11, wherein each electric motor is a 2500 HP, 4160V AC motor.

16. The system of claim 11, wherein the first and second trailer units are each selected from the group consisting of a skid, a trailer and a container.

17. A portable power generation system comprising: a turbine generator, mounted on a first trailer unit, operable to generate AC electrical power electrically coupled to a remote fault protector by at least 6 first high voltage AC conductors, wherein the remote fault protector is electrically coupled by at least 6 second high voltage AC conductors to a 12-pulse rectifier assembly operable to generate DC electrical power; two inverter units, mounted on a second trailer unit, electrically coupled to said rectifier assembly by at least two first high voltage DC conductors, wherein each of said inverter units comprises: a) an inverter control and disconnect section containing a DC bus single pole/single throw disconnect, a DC reactor, and a variable frequency drive input contactor, wherein the variable frequency drive input contactor is electrically coupled to a pre-charge board; and b) an inverter cell section electrically coupled to the inverter control and disconnect section, which inverter cell section contains a 770 A, 18-cell inverter, having a 6400V DC input and a 4160V AC output; and two electric motors, mounted on said second trailer unit, wherein each of said electric motors is electrically connected separately to one of said two inverter units by a set of two or more high voltage AC conductors, wherein each of said electric motors drive one or more well service pumps.

18. The system of claim 17, wherein the first and second trailer units are each selected from the group consisting of a skid, a trailer and a container.

\* \* \* \* \*